US007430672B2

(12) United States Patent
Rotem et al.

(10) Patent No.: US 7,430,672 B2
(45) Date of Patent: Sep. 30, 2008

(54) METHOD AND APPARATUS TO MONITOR POWER CONSUMPTION OF PROCESSOR

(75) Inventors: Efraim Rotem, Haifa (IL); Oren Lamdan, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 332 days.

(21) Appl. No.: 10/973,396

(22) Filed: Oct. 27, 2004

(65) Prior Publication Data

US 2006/0090086 A1 Apr. 27, 2006

(51) Int. Cl.
*G06F 1/00* (2006.01)
(52) U.S. Cl. ....................................................... 713/300
(58) Field of Classification Search .................. 713/300
See application file for complete search history.

(56) References Cited

U.S. PATENT DOCUMENTS

| 6,021,502 | A | * | 2/2000 | Ando | 713/340 |
| 6,091,255 | A | * | 7/2000 | Godfrey | 324/760 |
| 6,367,023 | B2 | * | 4/2002 | Kling et al. | 713/340 |
| 6,415,388 | B1 | * | 7/2002 | Browning et al. | 713/322 |
| 6,564,328 | B1 | * | 5/2003 | Grochowski et al. | 713/320 |
| 2003/0125900 | A1 | | 7/2003 | Orenstien et al. | |
| 2003/0135771 | A1 | * | 7/2003 | Cupps et al. | 713/320 |
| 2004/0128426 | A1 | * | 7/2004 | Wilcox | 711/1 |
| 2005/0275365 | A1 | * | 12/2005 | Currie et al. | 318/471 |
| 2006/0020831 | A1 | * | 1/2006 | Golla et al. | 713/300 |

FOREIGN PATENT DOCUMENTS

EP 0 901 063 3/1999

OTHER PUBLICATIONS

International Search Report for PCT/US2005/031595, mailed on May 15, 2006.
David Brooks et al., "Wattch: A Framework for Architectural-Level Power Analysis and Optimizations", http://www.eecs.harvard.edu/-dbrooks/lsca2000.pdf, pp. 83-94, printed from the Internet on Oct. 27, 2004.

* cited by examiner

*Primary Examiner*—Rehana Perveen
*Assistant Examiner*—Mohammed H Rehman
(74) *Attorney, Agent, or Firm*—Pearl Cohen Zedek Latzer, LLP

(57) ABSTRACT

Briefly, a processor and a method to control a power consumption of the processor are presented. The method may include: counting a micro-architecture event of a component of the processor, estimating the power consumption value of the processor based on a weighted value of the counted micro-architecture event and filtering the weighted value of the counted micro-architecture event.

30 Claims, 4 Drawing Sheets

METHOD AND APPARATUS TO MONITOR POWER CONSUMPTION OF PROCESSOR

BACKGROUND OF THE INVENTION

A central processing unit (CPU) may integrate multiple processing capabilities on a single die. Performance of the CPU may be thermally limited and may depend on both "external" cooling capabilities such as, for example, passive and active components (e.g. heat sink, fans, etc.) and "internal" power control mechanisms such as, for example, a software application. The power control mechanism may include a power detection mechanism and a power reduction mechanism. The power detection mechanism may detect high power conditions and may invoke the power reduction mechanism.

The power control mechanism may use power monitoring methods, which may be based on analog temperature measurements. The power monitoring methods may require the use of relatively large on die components, which may be located at a limited number of predetermined "hot-spots", to report the power consumption of the CPU.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
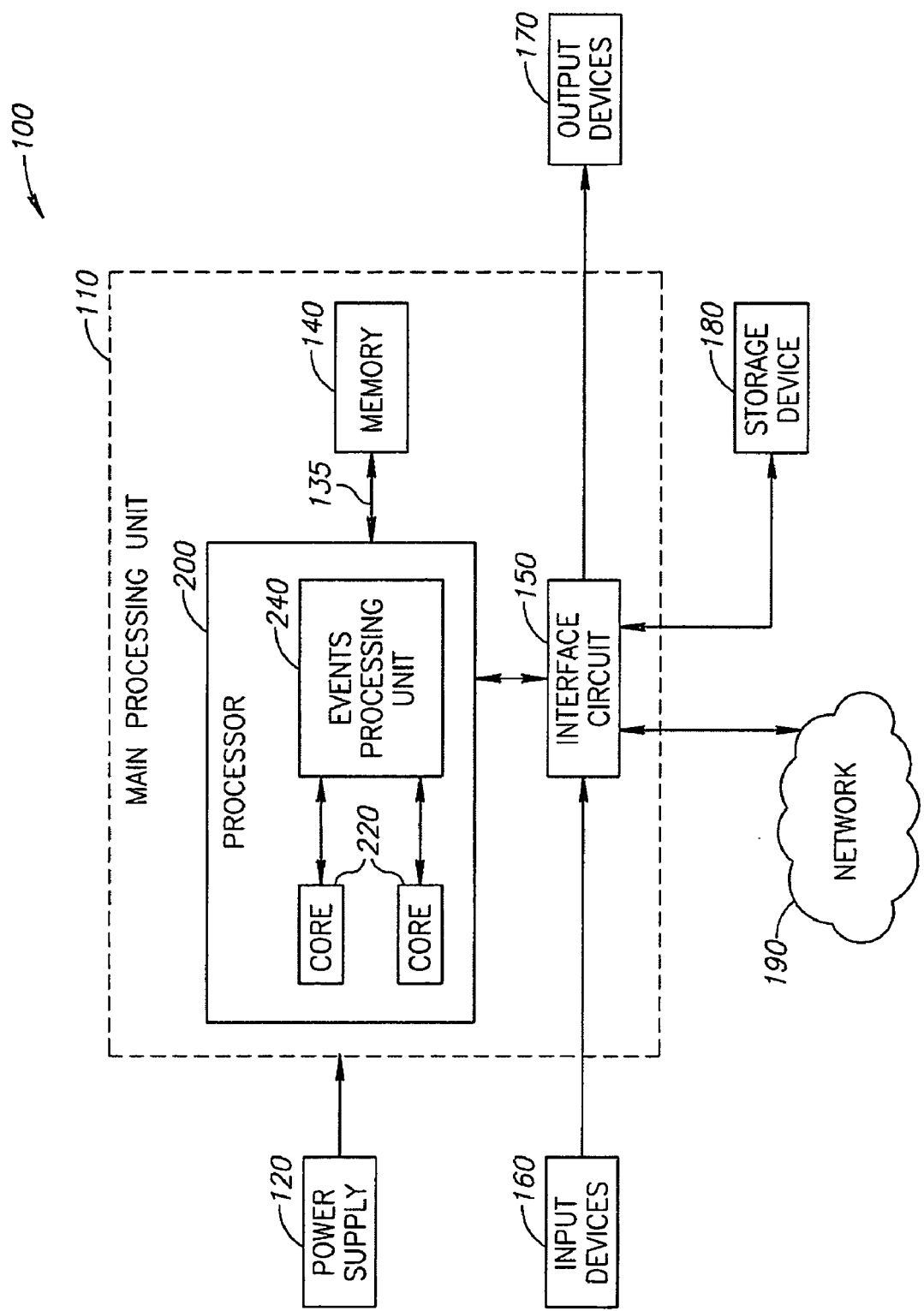
FIG. 1 is a block diagram of computer system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of instructions" describes two or instructions.

It should be understood that the present invention may be used in a variety of applications. Although the present invention is not limited in this respect, the circuits and techniques disclosed herein may be used in many apparatuses such as computer systems, processors, CPU or the like. Processors intended to be included within the scope of the present invention include, by way of example only, a reduced instruction set computer (RISC), a processor that have a pipeline, a complex instruction set computer (CISC) and the like.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Turning to FIG. 1, a block diagram of a computer system 100 according to an exemplary embodiment of the invention is shown. Although the scope of the present invention is not limited in this respect, computer system 100 may be a personal computer (PC), a personal digital assistant (PDA), an Internet appliance, a cellular telephone and/or any other computing device. In one example, computer system 100 may include a main processing unit 110 powered by a power supply 120. In embodiments of the invention, main processing unit 110 may include a processor 200 electrically coupled by a system interconnect 135 to a memory device 140 and one or more interface circuits 150. For example, the system interconnect 135 may be an address/data bus, if desired. It should be understood that interconnects other than busses may be used to connect processor 200 to memory device 140. For example, one or more dedicated lines and/or a crossbar may be used to connect processor 200 to memory device 140.

According to some embodiments of the invention, may include any type of central processing unit (CPU). According to some embodiments of the invention, processor 200 may include one or more cores 220 and an events processing unit 240. In addition, processor 200 may include a cache memory (not shown), such as, for example, static random access memory (SRAM) and the like, or any other type of internal integrated memory. Memory device 140 may include a dynamic random access memory (DRAM), a non-volatile memory, or the like. In one example, memory device 140 may store a software program which may be executed by processor 200, if desired.

Although the scope of the present invention is not limited in this respect, interface circuit(s) 150 may include an Ethernet interface and/or a Universal Serial Bus (USB) interface, and/or the like. In some exemplary embodiments of the invention, one or more input devices 160 may be connected to interface circuits 150 for entering data and commands into the main processing unit 110. For example, input devices 160 may include a keyboard, mouse, touch screen, track pad, track ball, isopoint, a voice recognition system, and/or the like.

Although the scope of the present invention is not limited in this respect, the output devices 170 may be operably coupled to main processing unit 110 via one or more of the interface circuits 150 and may include one or more displays, printers, speakers, and/or other output devices, if desired. For example, one of the output devices may be a display. The display may be a cathode ray tube (CRT), a liquid crystal display (LCD), or any other type of display.

Although the scope of the present invention is not limited in this respect, computer system 100 may include one or more storage devices 180. For example, computer system 100 may include one or more hard drives, one or more compact disk (CD) drive, one or more digital versatile disk drives (DVD), and/or other computer media input/output (I/O) devices, if desired.

Although the scope of the present invention is not limited in this respect, computer system 100 may exchange data with other devices via a connection to a network 190. The network connection may include any type of network connection, such as an Ethernet connection, a digital subscriber line (DSL), a telephone line, a coaxial cable, etc. Network 190 may be any type of network, such as the Internet, a telephone network, a cable network, a wireless network such as, for example, a network complying IEEE standard 802.11 a/b/g, 1999, and/or the like.

Although the scope of the present invention is not limited to this exemplary embodiment of the invention, events processing unit 240 may count one or more micro-architecture events from cores 220 and may estimate a power consumption value of processor 200 based on a weighted value of the one or more counted micro-architecture events. Events processing unit 240 may provide one or more weighted values to one or more events, respectively. Event processing unit 240 may sum the one or more weighted events and may filter the sum of weighted events. For example, events processing unit 240 may filter the sum of weighted events by calculating an exponentially weighted moving average, if desired. It should be understood that events processing unit 240 may be implemented by hardware, or by software, or by any combination of hardware and/or software. Furthermore, processor 200 may provide an output signal corresponding to the estimated power consumption value through output devices 170 and/or through network 190, for example, such that one or more computers may read the estimated power consumption value.

The one or more computers may execute a power consumption application that may send instructions to balance the power of processor 200, if desired. In some embodiments of the invention, processor 200 may receive from the one or more computers instructions to balance the power of processor 200 based on the estimated power consumption value, although the scope of the present invention is not limited in this respect.

Although the scope of the present invention is not limited in this respect, in some embodiments a micro-architecture event may be characterized by micro-architecture instructions such as, for example, LOAD, STORE, ADD, SUBTRACT, MULT, SHIFT, AND, etc. In addition, the instructions may include input values and output values such as, for example, register values and/or constants.

Figure 2A:
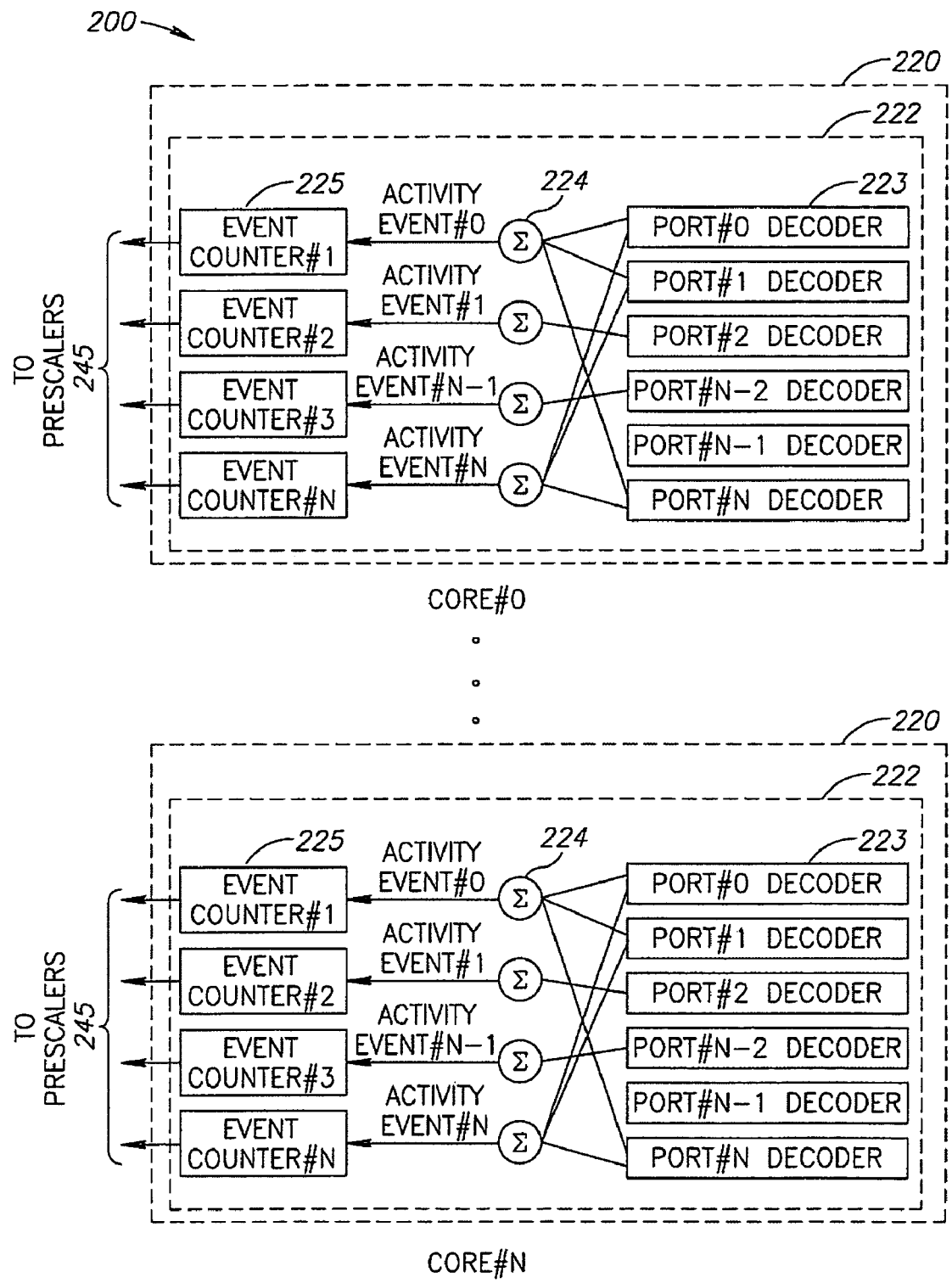
FIGS. 2A and 2B are illustration of a block diagram of a processor according to an exemplary embodiment of the present invention.
Figure 2B:
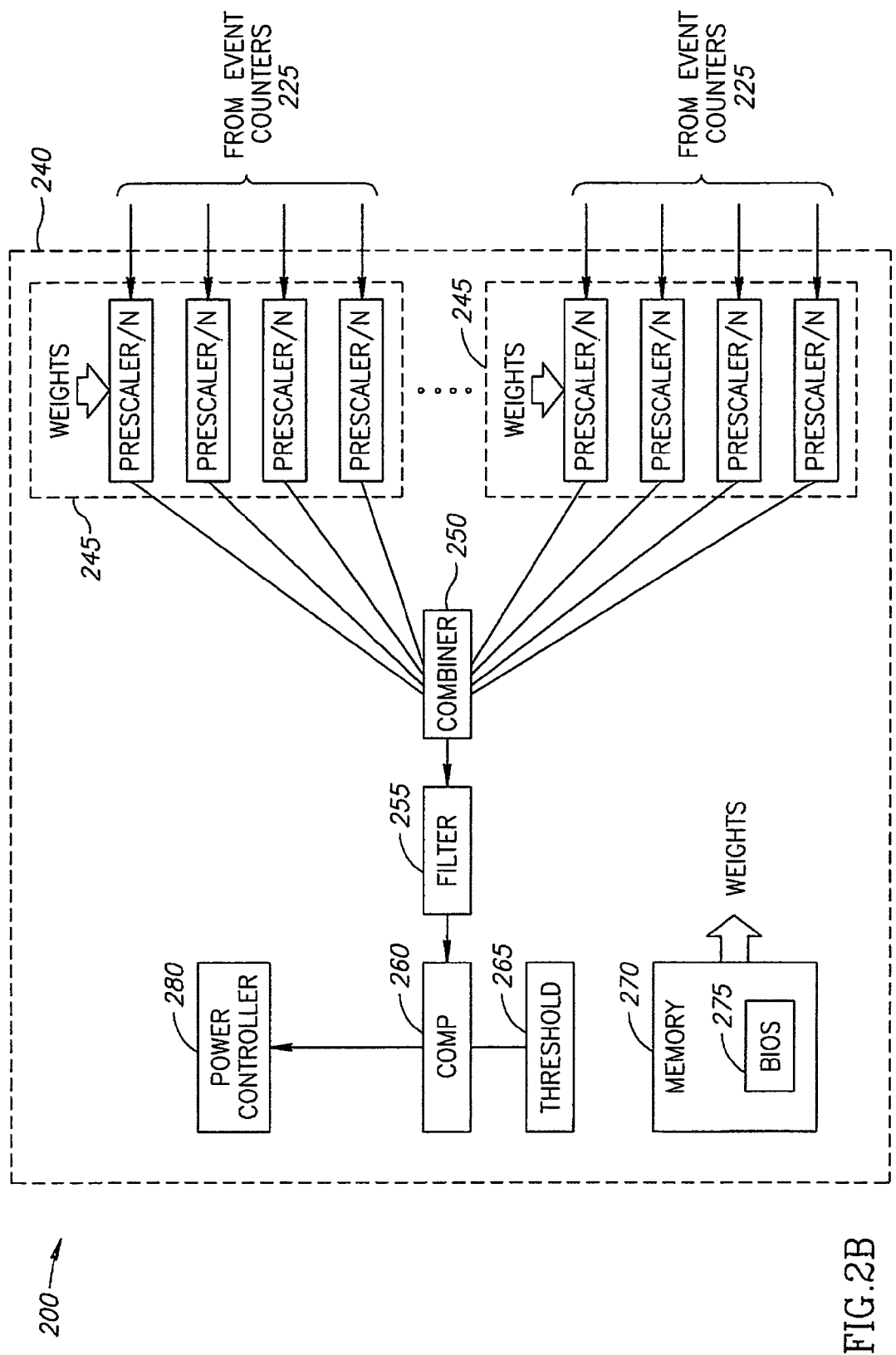

Turning to FIG. 2, a detailed block diagram of processor 200 of FIG. 1 according to an exemplary embodiment of the invention is shown. Although the scope of the present invention is not limited in this respect, as described above, processor 200 may include one or more cores 220 and events processing unit 240. According to some embodiments of the invention, one or more of cores 220 may include a micro-architecture counter 222. For example, micro-architecture counter 222 may include one or more port decoders 223, one or more accumulators 224 and one or more event counters 225.

Although the scope of the present invention is not limited in this respect, event processing unit 240 may include one or more programmable prescaler units 245, a combiner 250, a filter 255, a comparator 260, a threshold 265, a memory 270, and a power controller 280. Memory 270 may include a basic input/output system (BIOS) 275 of the processor Although the scope of the present invention is not limited in this respect, decoders 223 may decode micro-architecture events from different components (e.g. ports) of cores of processor 200, for example, one or more of cores 220. Accumulators 224 may accumulate the decoded events and may provide an activity indication of a port to counter 225. For example, the events may be detected by the decoders of ports 0, 1 and N. The micro-architecture events may be accumulated by a single accumulator, e.g. accumulator 224, and may be counted by counter 225 to provide to events processing unit 240 a count of micro-architecture events, if desired.

According to one embodiment of the invention, events processing unit 240 may include one or more programmable prescaler units 245. The number of programmable prescaler units 245 may be based on the number of event types decoded by the system, although the scope of the present invention is not limited in this respect. Programmable prescaler unit 245 may scale the counted micro-architecture events according to a weight. For example, if an event corresponds to five units of power, the weight assigned to the event may be five, although the scope of the present invention is in no way limited in this respect. According to exemplary embodiment of the invention, programmable prescaler unit 245 may load the weight from memory 270 and the weight may be assigned to the counted micro-architecture event. According to some embodiments of the invention, the weight may be provided by BIOS 275 of processor 200, if desired.

Although the scope of the present invention is not limited in this respect, combiner 250 may combine the weighted counted micro-architecture events from programmable prescalers 245 and may generate a power estimation value by combining the weighed values of micro-architecture events of cores 220. In some embodiments of the invention, filter 255 may filter the weighted micro-architecture event and may provide the filtered event to comparator 260. Filter 255 may be, for example, a low pass filter, a rolling average filter, an Alpha Beta filter, which is also known as an exponentially weighted moving average (EWMA) filter, or the like.

Figure 3:
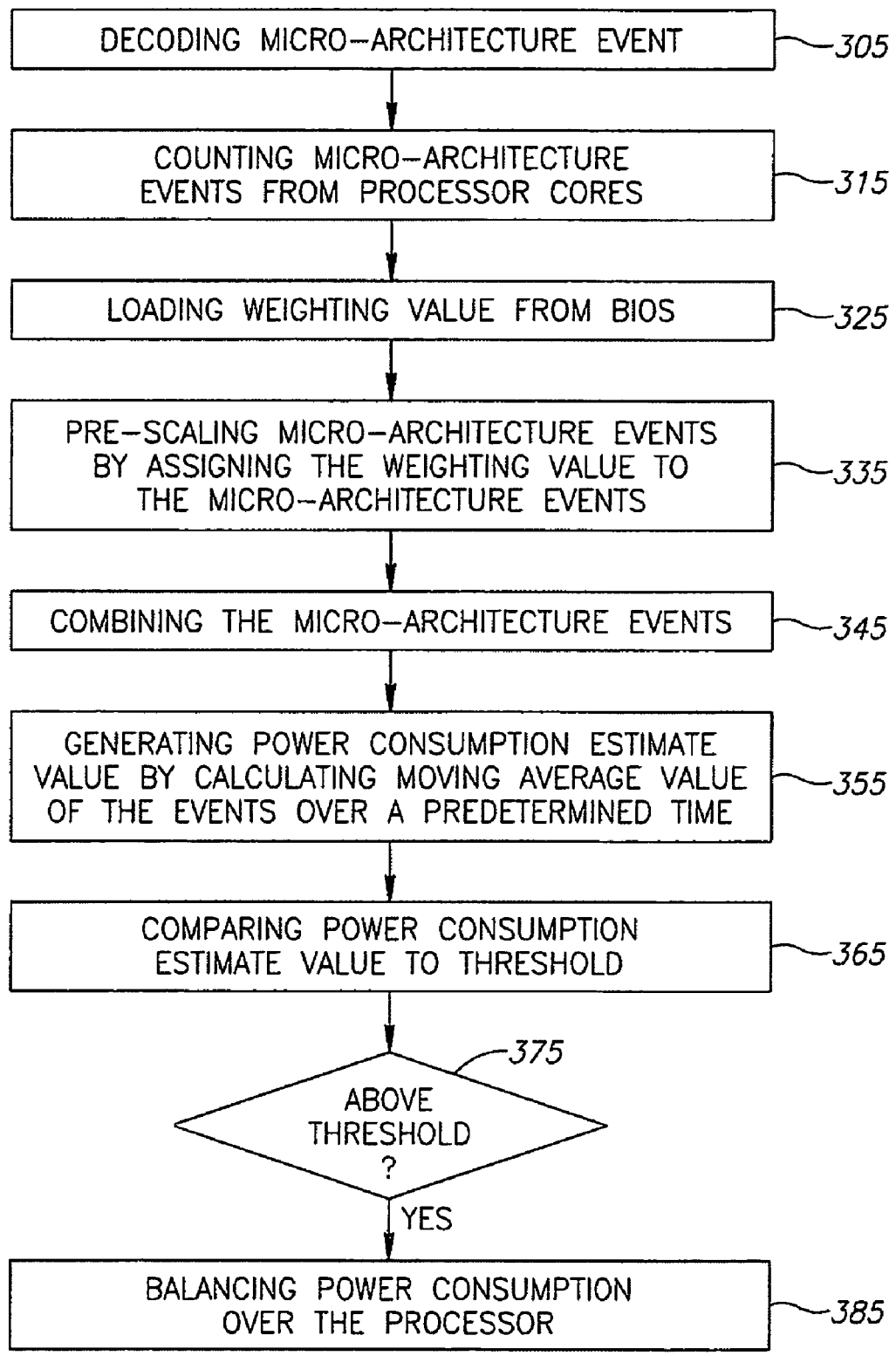
FIG. 3 is a flowchart of a method to reduce a power consumption of a processor according to exemplary embodiments of the invention.

Although the scope of the present invention is not limited in this respect, comparator 260 may compare the power estimation value to threshold 265. For example, the threshold may be the maximum number of power units that may be handled by a power reduction mechanism of processor 200. According to an embodiment of the invention, if the result of the comparison is above threshold 265, power controller 280 may control parameters to balance the power consumption of components of processor 200. For example, power controller 280 may vary the voltage, or the frequency, or the voltage and the frequency of processor 200, and/or may periodically stall the operation of processor 200, in order to reduce the power consumption of processor 200, if desired Turning to FIG. 3, a flowchart of a method according to an exemplary embodiment of the invention is shown. Although the scope of the present invention is not limited in this respect, processor 200 may include one or more cores, for example cores 220. Cores 220 may include components, ports, etc. that may perform micro-architecture events, for example, operations of the components of the cores may be triggered by software instructions, if desired. Decoders (e.g. decoders 223) may decode the micro-architecture events (text block 305) and counters (e.g. counters 225) may count the micro-architecture events of components of the processor cores (text block 315).

According to some embodiments of the invention, the counters may provide values that may be used to estimate a power consumption of the processor, to detect "hot spots" in the processor cores and the like. According to some embodiments of the invention, estimation of the power consumption of the processor may be done by loading a weighting value from the processor BIOS (text block 325), pre-scaling the counted micro-architecture event by assigning the weighting value to the counted micro-architecture event (text block 335) and combining the weighted micro-architecture event to provide a power consumption value, if desired (text block 345). In some embodiments of the invention, the weighting value may be programmed according to actual silicon layout based measurements, if desired.

Additionally or alternatively, the power consumption value may be generated by calculating a moving average of the events over a predetermined time (text block 355). For example, in some embodiments the predetermined time may be 1 millisecond, if desired. It should be understood that the moving average is only one example of a method that may be to filter the combined values of micro-architecture events; other methods of filtering such as, for example, an exponentially weighted moving average may be used with different embodiments of the invention, if desired.

Although the scope of the present invention is not limited in this respect, the power consumption estimate value may be compared to a threshold (text block 365), for example, to threshold 265. In some embodiments of the invention the threshold may be substantially equivalent to the to a maximum power consumption level of the processor, e.g., a power consumption level that corresponds to the maximum cooling capacity of a cooling device associated with the processor, e.g., an external passive and/or active cooling device.

According to some embodiments of the invention, if the power consumption estimate value is above the threshold (text block 375) a power controller, e.g. power controller 280, may balance a load across the processor components in order to reduce the power consumption of the processor (text block 385). For example, the power controller may vary a voltage level of the processor and/or a frequency level of the processor and/or the voltage level and the frequency of the processor, and may periodically stall operation the processor, or the like.

Although the scope of the present invention is not limited in this respect, it should be understood that the term "power" as used herein may also refer to energy; for example, power reduction may also be read as an energy reduction, power control may also be read as energy control, and the like While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method for estimating power consumption in a processor, comprising:
   decoding a micro-architecture event from a port of a core of the processor for forming a decoded micro-architecture event; generating at least one software interrupt by the decoded micro-architecture event;
   counting said at least one software interrupt for forming a count of said decoded micro-architecture event;
   pre-scaling said count of said decoded micro-architecture event by assigning a weighting value to said count of said decoded micro-architecture event; and
   generating a power consumption estimated value by calculating a moving average of two or more of said count of said decoded micro-architecture event over a predetermined time.

2. The method of claim 1, wherein pre-scaling comprises:
   loading said weighting value from a basic input/output system of the processor.

3. The method of claim 1, comprising:
   counting two or more micro-architecture events;
   pre-scaling the two or more counted micro-architecture events by assigning two or more programmable weights to the counted micro-architecture events, respectively; and
   combining the two or more weighted micro-architecture events to generate a power estimate value.

4. The method of claim 1 wherein the processor includes two or more cores, the method comprising:
   decoding two or more micro-architecture events from two or more ports of the two or more cores for forming two or more decoded micro-architecture events; generating two or more software interrupts by said two or more decoded micro-architecture events;
   counting said two or more software interrupts for forming two or more counts of said decoded micro-architecture events;
   pre-scaling said two or more counts of said decoded micro-architecture events by assigning a weighting value to said two or more counts of said decoded micro-architecture events; and
   generating the power consumption value of the processor based on said moving average of said two or more of said counts of said decoded micro-architecture events.

5. The method of claim 4, comprising:
   balancing a load across two or more cores based on the weighting value of the two or more counts of said micro-architecture events.

6. The method of claim 4, further comprising:
   comparing the power estimation value to a threshold; and
   reducing the power consumption of the processor if the power estimation value exceeds said threshold.

7. The method of claim 6, wherein reducing comprises: varying a voltage level and a frequency of the processor.

8. The method of claim 6, wherein reducing comprises: varying a frequency of the processor and periodically stalling the processor.

9. A processor comprising:
a decoder to decode a micro-architecture event from a port of a core of the processor and form a decoded micro-architecture event; a generator to generate at least one software interrupt by the decoded micro-architecture event;
a counter to count said at least one software interrupt and to form a count of said decoded micro-architecture event;
a programmable pre-scaler to pre-scale said count of said decoded micro-architecture event by assigning a weighting value to said decoded micro-architecture event; and
a power estimator to generate a power consumption estimated value by calculating a moving average of two or more of said count of said decoded micro-architecture event over a predetermined time.

10. The processor of claim 9, comprising:
two or more cores, wherein a core of the two or more cores includes a decoder to decode the micro-architecture event of a component of the core; and
a combiner to generate a power estimation value by combining weighed values of two or more micro-architecture events of the two or more cores, respectively.

11. The processor of claim 9, comprising:
a comparator to compare the power estimation value to a threshold; and
a power controller to balance the power consumption of the processor according to the threshold.

12. The processor of claim 11 wherein, the power controller is able to balance the power consumption by varying a voltage and frequency of the processor.

13. A computer system comprising:
a processor that includes at least:
a decoder to decode a micro-architecture event from a port of a core of the processor and form a decoded micro-architecture event; a generator to generate at least one software interrupt by the decoded micro-architecture event;
a counter to count said at least one software interrupt and to form a count of said decoded micro-architecture event
a programmable pre-scaler to pre-scale said count of said decoded micro-architecture event by assigning a weighting value to said decoded micro-architecture event; and
a power estimator to generate a power consumption estimated value by calculating a moving average of two or more of said count of said decoded micro-architecture event over a predetermined time.

14. The computer system of claim 13, wherein the processor includes at least two or more cores which, a core of the two or more cores comprises:
a decoder to decode the micro-architecture event of a component of the core; and
a combiner to generate a power estimation value by combining weighted values of two or more micro-architecture events of the two or more cores, respectively.

15. The computer system of claim 13, wherein the processor comprises:
a comparator to compare the power estimation value to a threshold; and
a power controller to balance the power consumption of the processor according to the threshold.

16. The computer system of claim 15, wherein, the power controller is able to balance the power consumption by varying a voltage and a frequency of the processor.

17. The computer system of claim 15 wherein, the power controller is able to balance the power consumption by varying a frequency of the processor and periodically stalling the processor.

18. A computer system comprising:
a processor which includes at least:
a decoder to decode a micro-architecture event from a port of a core of the processor and form a decoded micro-architecture event; a generator to generate at least one software interrupt by the decoded micro-architecture event;
a counter to count said at least one software interrupt and form a count of said decoded micro-architecture event
a programmable pre-scaler to pre-scale said count of said decoded micro-architecture event by assigning a weighting value to said decoded micro-architecture event; and
a power estimator to generate a power consumption estimated value by calculating a moving average of two or more of said count of said decoded micro-architecture event over a predetermined time; and
a liquid crystal display.

19. The computer system of claim 18, wherein the processor includes at least two or more cores and a core of the two or more cores comprises:
a decoder to decode the micro-architecture event of a component of the core; and
a combiner to generate a power estimation value by combining weighed values of two or more micro-architecture events of the two or more cores, respectively.

20. The computer system of claim 18, wherein the processor comprises:
a comparator to compare the power estimation value to a threshold; and
a power controller to balance the power consumption of the processor according to the threshold.

21. The computer system of claim 20, wherein, the power controller is able to balance the power consumption by varying a voltage and frequency of the processor.

22. The computer system of claim 18 wherein, the power controller is able to balance the power consumption by varying a frequency of the processor and periodically stalling the processor.

23. An article comprising: a computer storage medium, having stored thereon instructions, that when executed, result in:
decoding a micro-architecture event from a port of a core of the processor for forming a decoded micro-architecture event; generating at least one software interrupt by the decoded micro-architecture event;
counting said at least one software interrupt for forming a count of said decoded micro-architecture event;
pre-scaling said count of said decoded micro-architecture event by assigning a weighting value to said count of said decoded micro-architecture event; and
generating a power consumption estimated value by calculating a moving average of two or more of said count of said decoded micro-architecture event over a predetermined time.

24. The article of claim 23, wherein the instruction of pre-scaling, when executed, results in:

loading said weighting value from a basic input/output system of the processor.

25. The article of claim 23, wherein the instruction of counting, when executed, result in:
   counting two or more micro-architecture events and further result in:
   pre-scaling the two or more counted micro-architecture events by assigning two or more programmable weights to the counted micro-architecture events, respectively; and
   combining the two or more weighted micro-architecture events to generate a power estimate value.

26. The article of claim 25, wherein the instructions, when executed, result in:
   decoding two or more micro-architecture events from two or more ports of the two or more cores for forming two or more decoded micro-architecture events; generating two or more software interrupts by the decoded micro-architecture events;
   counting said two or more software interrupts for forming two or more counts of said decoded micro-architecture events;
   pre-scaling said two or more counts of said decoded micro-architecture events by assigning a weighting value to said two or more counts of said decoded micro-architecture events; and
   generating the power consumption value of the processor based on said moving average of said two or more of said counts of said decoded micro-architecture events.

27. The article of claim 26, wherein the instructions, when executed, result in:
   balancing a load across two or more cores based on the weighting value of the two or more counts of said micro-architecture events.

28. The article of claim 23, wherein the instructions, when executed, result in:
   comparing the power estimation value to a threshold; and
   reducing the power consumption of the processor according to the threshold.

29. The article of claim 28, wherein the instruction of reducing, when executed, result in:
   varying a voltage level and a frequency of the processor.

30. The article of claim 23, wherein the instructions, when executed, result in:
   outputting an estimated power consumption value; and
   receiving instructions to balance the power of the processor based on the estimated power consumption value.

* * * * *